Nov. 9, 1965    G. R. HARRINGTON    3,216,087
METHOD OF MANUFACTURING A TAPERED NEEDLE
BEARING UNIVERSAL JOINT
Filed Oct. 18, 1962    4 Sheets-Sheet 1
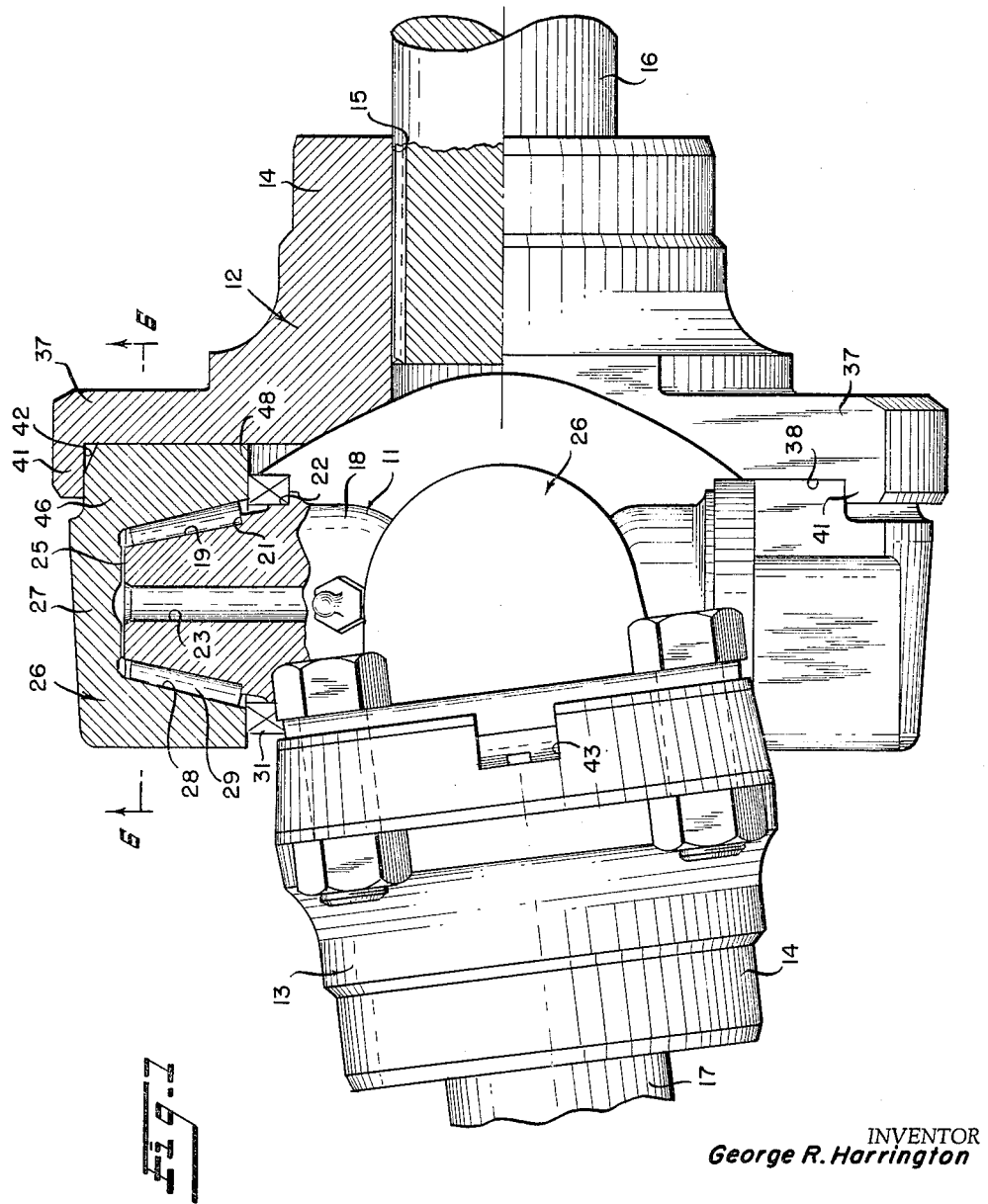
INVENTOR
George R. Harrington
BY *Strauch, Nolan & Neale*
ATTORNEYS

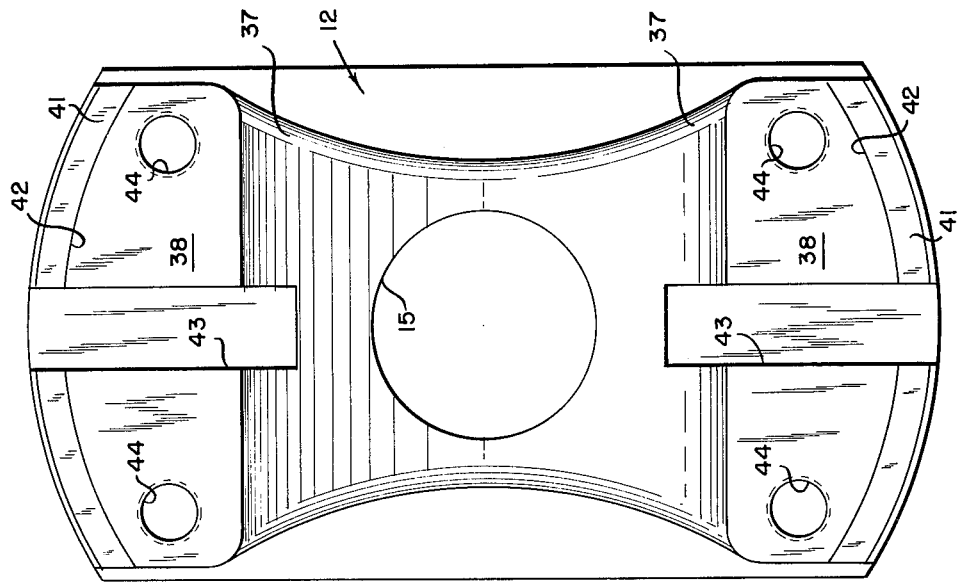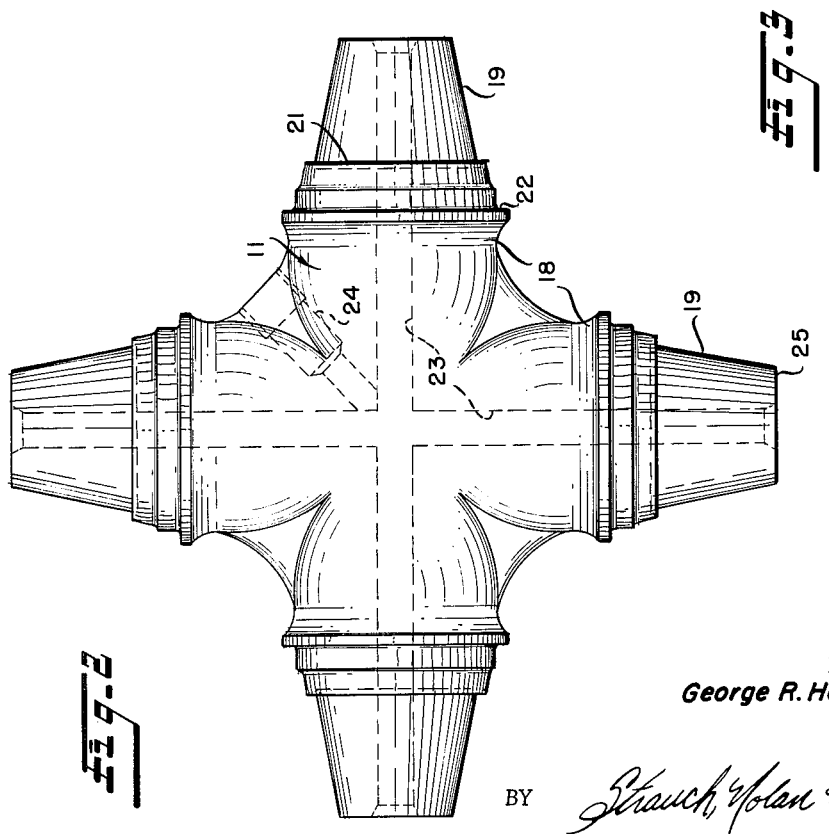

Nov. 9, 1965  G. R. HARRINGTON  3,216,087
METHOD OF MANUFACTURING A TAPERED NEEDLE
BEARING UNIVERSAL JOINT
Filed Oct. 18, 1962  4 Sheets-Sheet 3
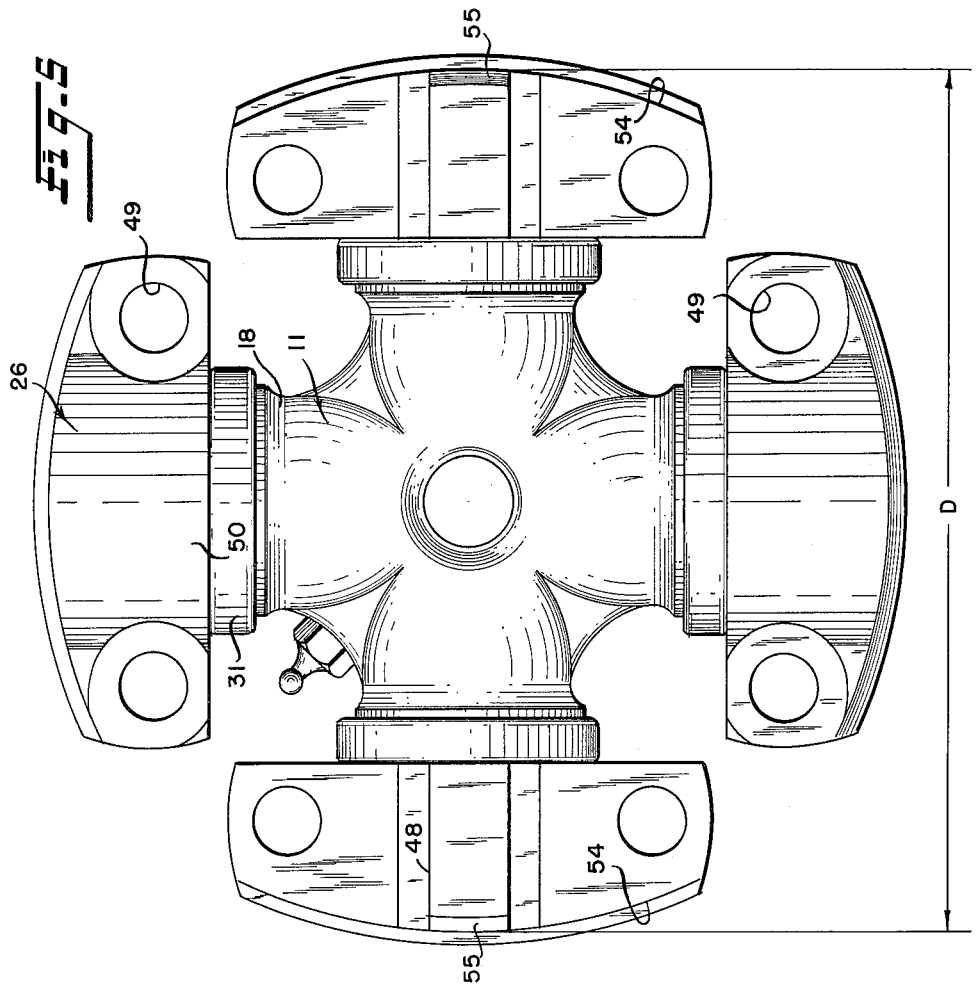
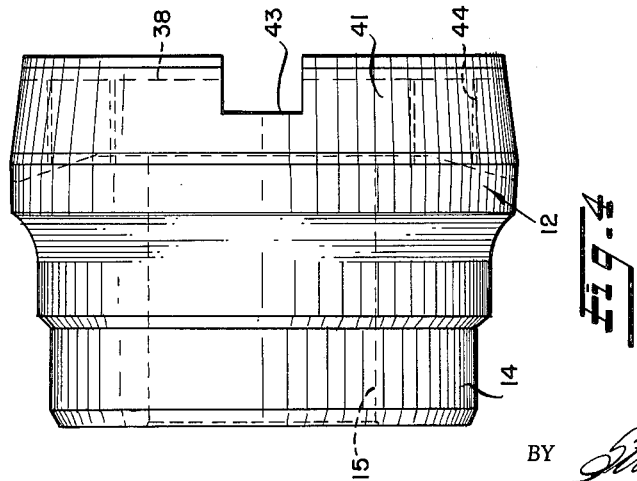
INVENTOR
*George R. Harrington*
BY
ATTORNEYS

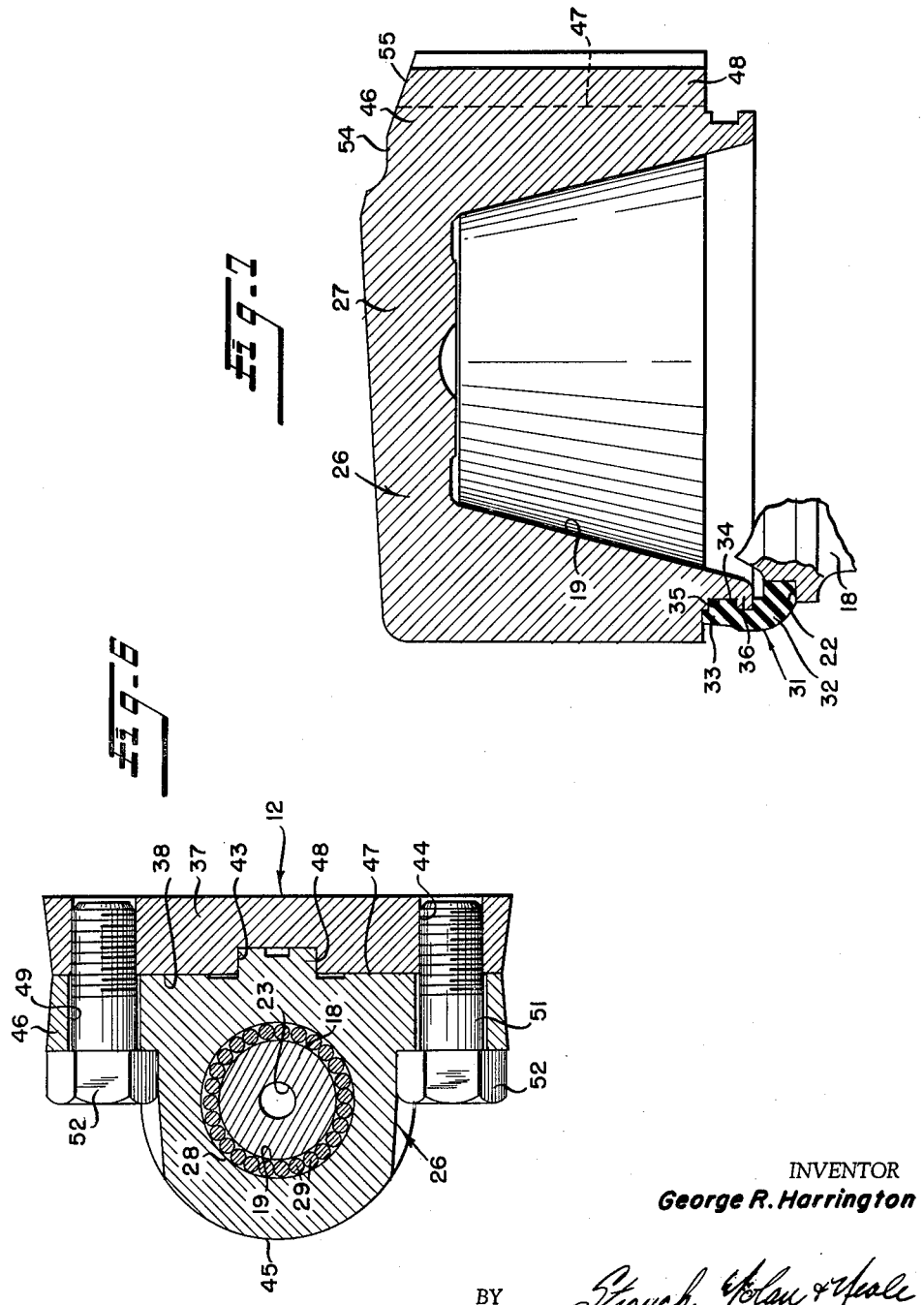

United States Patent Office 3,216,087
Patented Nov. 9, 1965

---

3,216,087
METHOD OF MANUFACTURING A TAPERED NEEDLE BEARING UNIVERSAL JOINT
George R. Harrington, Kalamazoo, Mich., assignor, by mesne assignments, to Rockwell-Standard Corporation, a corporation of Delaware
Filed Oct. 18, 1962, Ser. No. 231,447
3 Claims. (Cl. 29—148.4)

This invention relates to universal joint assemblies of the yoke and cross type and more in particular to a trunnion bearing mounting and loading arrangements and method of manufacture.

In the present invention provisions are made to overcome disadvantages inherent in conventional universal joints of the yoke and cross type by providing tapered needle roller bearings placed on tapered trunnion ends of the cross and retained by cups having matching internally tapered bearing surfaces and machined external shoulders adapted to fit with a correspondingly machined yoke in an assembly which assures establishment and maintenance of proper pre-load conditions for the bearings, for smooth running operation and adequate sealing between the trunnion and the cup to prevent escape of lubricant.

The major object of the invention is to provide a method of making a tapered needle bearing universal joint which embodies the novel steps of assembling the tapered end trunnion cross member, tapered needle bearings and bearing cups together under desired bearing preload condition and while maintaining that preload accurately forming external convex cylindrical surfaces on said cups of such diameter that when the cups are engaged with corresponding concave cylindrical yoke surfaces in the final joint assembly the bearings will be automatically maintained under said preload condition.

A further object of the invention is to provide a novel method of manufacturing a universal joint having tapered needle bearings on the trunnions which comprises providing the bearing cups and the associated yoke with accurately formed and dimensioned peripheral surfaces, axially relatively moving said yoke and cross carrying the bearing assemblies to engage said surfaces to establish and maintain bearing pre-load, and rigidly securing said yoke and bearing cups together.

Another object of the invention is to provide a novel method of manufacturing a universal joint wherein an assembly of a spider having tapered end trunnion surfaces mounting tapered needle bearings enclosed by bearing cups is placed in a fixture where external cylindrical cup surfaces at one end are accurately ground to a dimension that will establish and maintain bearing preload when said cup surfaces are placed in interference fit with corresponding surfaces of a yoke.

Further objects of the invention will presently appear as the description proceeds in connection with the annexed drawings wherein:

FIGURE 1 is an elevation partly broken away and in section showing a preferred embodiment of the invention wherein the cross or spider of the universal joint has tapered trunnion bearings enclosed by cups which are accurately preloaded by interfit with the associated yokes;

FIGURE 2 is an end elevation of the cross apart from the joint;

FIGURE 3 is an end view of a yoke apart from the joint;

FIGURE 4 is a top plan view of the yoke of FIGURE 3;

FIGURE 5 is an end view of the cross with the bearing cups in place on the trunnions and ready for assembly with the yokes;

FIGURE 6 is a section substantially on line 6—6 of FIGURE 1 showing structural detail at the trunnion; and FIGURE 7 is a section through the bearing cup showing structural detail and also showing a preferred form of seal.

The universal joint assembly comprises essentially a cross or spider 11 pivotally secured to a pair of opposed yokes 12 and 13. The yokes have central hubs 14 formed with internal bores 15 wherein rotatable shafts 16 and 17 respectively are non-rotatably secured, as by splines. Shafts 16 and 17 may be angularly disposed during power transmission in either direction.

As illustrated in FIGURE 2, the cross 11 is of rigid metal having four 90° apart similar trunnion arms 18 formed at their ends with truncated cone-shaped bearing surfaces 19. At the inner end of each surface 19 is an outwardly facing flat annular bearing element engaging shoulder 21, and inwardly of shoulder 21 is a larger diameter seal mounting shoulder 22. Cross 11 has diametral lubricant passages 23 extending to the outer ends of all trunnion bearing surfaces 19 and supplied with lubricant by a suitable fitting disposed in passage 24. Each trunnion terminates in an end face 25 that is flat and perpendicular to the trunnion axis, and passages 23 open through this face.

A bearing cup 26 is mounted on each trunnion arm 18 and is of inverted cup shape with a closed end 27 and an internal frusto-conical bearing surface 28 of slightly greater slope than trunnion surface 19. A cageless tapered needle roller bearing assembly is provided between bearing surfaces 19 and 28, consisting of a series of side by side tapered needle rollers 29 that rest at their inner ends on shoulder 21 which (FIGURE 1) is correspondingly slightly tilted relative to the trunnion axis.

The upper ends of needles 29 terminate short of trunnion end face 25 and since in the assembly the cups 26 are in bearing engagement with the cross only through needles 29 a space is provided within each cup between face 25 and cup bottom 27 to allow lubricant to spread into the needle bearing assembly.

A suitable annular seal indicated at 31 in FIGURE 1 and shown in preferred detail in FIGURE 7 is provided between the cross 11 and each cup 26. This seal has a body portion 32 pressed or otherwise tightly fitted about shoulder 22 and a relatively flexible skirt 33 internally formed with an annular rib 34 that extends into an external annular groove 35 on rim 36 that projects inwardly from the cup at the open end of bearing surface 19.

In operation, as cup 26 and trunnion 18 relatively rock about the trunnion axis, rib 34 turns freely in groove 35 to maintain the seal and prevent loss of lubricant as well as ingress of dust or water.

Each yoke is essentially of identical structure, and FIGURES 1, 3, 4, 5 and 6 illustrate the structure of yoke 12. Yoke 12 has 180° apart symmetrical arms 37 extending diametrically from hub 14. FIGURE 3 is a view looking at yoke 12 from the left in FIGURE 1 and each arm 37 has parallel internal trunnion cups transverse engaging surfaces 38 lying in a common plane.

At each end yoke 12 is formed with an arcuate inwardly extending lip 41 formed with a concave smooth cylindrical surface 42. Surfaces 42 are of the same curvature and lie in the same cylindrical envelope, being symmetrical about the axis of hub bore 15, and they insersect the associated transverse surfaces at right angles.

Relatively deep rectangular cross section recesses 43 which are identical in shape and size and arranged in diametral alignment are formed in the yokes to open axially inwardly and radially outwardly. As shown in FIGURES 3 and 4 these recesses 43 essentially bisect both surfaces 38 and 42. At each side of each recess 43 a pair of symmetrically disposed threaded bolt receiving bores 44 is disposed.

Referring now to FIGURES 5 and 6 each trunnion cup, while generally cylindrical as at 45 on its outer side, has a wider flanged inner side 46 formed with a flat surface 47 adapted in the assembly to abut flush upon an associated yoke surface 38. Surface 47 lies in a plane parallel to the axis of bearing surface 28, and it is centrally interrupted by a projecting tongue 48 of rectangular cross section centered with the axis of surface 28 and fitting snugly into yoke recess 43. Flange 46 is formed symmetrically with bolt receiving holes 49 that align with threaded bores 44 in the assembly. Bolts 51 having heads 52 extend through holes 49 into threaded engagement with bores 44. When these bolts are drawn tight the respective bearing cups 26 are drawn into tight engagement with the yokes.

Referring to FIGURE 7 each cup 26 is formed along the outer edge of flange 46 with a convex smooth surface 54 of cylindrical contour disposed inwardly of a beveled approach surface 55. Surfaces 54 in the assembly are adapted to underlie yoke rims 41 in snugly fitting engagement with the concave yoke surfaces 42.

When the universal joint of the invention is to be manufactured, the shafts 16 and 17 are attached to the respective yokes, and the four trunnion bearing cups are mounted on the cross arms 14 with the bearing needles 29 in place and the seals 31 in place. As shown in FIGURE 5 the diametrically opposite cups 26 face axially in the same direction, and the pairs of cups face in opposite axial directions, so that they may enter the open ends of the respective yokes.

The parts are so dimensioned that in assembly the opposed convex cup surfaces 54 lie in about the same cylindrical envelope and are spaced apart substantially the diameter of the concave yoke surfaces 42. Then the assembly is placed in a fixture where the bearings are preloaded by forces acting axially on the cups and the cup surfaces 54 are finish ground to the cylindrical diameter D of FIGURE 5 which is the dimension that will provide proper preload of the bearings when surfaces 54 enter interference fit with yoke surfaces 42. The radially interfitting cylindrical surfaces 54 and 42 are very accurately machined within extremely small tolerances. When the parts are in assembly with the bearing cups in interference fit with the yokes, as shown in FIGURE 1, the opposite yoke rims will axially retain the preload conditions of the bearing in the associated cups 26. By accurate machining of the surfaces 54 and 42 this bearing load can be accurately effected and held.

Once the opposed cup pairs 26 have been press fitted into the yokes by relative axial movement of the cross and yokes, entry of the cups being facilitated by beveled approach surfaces 55, then the bolts 51 are inserted and drawn tight. Surfaces 38 and 47 which axially abut in full surface engagement when the bolt assemblies are drawn tight are accurately machined smooth and at right angles to the cylindrical surfaces 42 and 54 so that there is no rocking of the tightened cups 26. As shown in FIGURE 6 there is a slight clearance between the smooth bores 49 and the shanks of bolts 51 to take care of small differences in disposition of the cups on the cross and so that the bolts will not affect any predetermined preload placed on the bearings and held by the machined peripheral interfit between the cups and the yokes. Besides accurately retaining the bearings under proper load, the foregoing arrangement properly relatively centers the yokes and the cross to reduce centrifugal unbalance during operation.

The seal 31 is sufficiently flexible axially of the trunnion arm not to interefere with bearing loading.

In the joint of the invention, the retained bearing cups 26 exert a definite pressure upon the enclosed tapered needle rollers 29 to assure full line contact of the tapered needles and thereby provide smooth and free rolling of the needles on the bearing surfaces of the cup and trunnion and prevent any sliding movement. The bearing cup surfaces 54 are accurately machined and ground under predetermined load in assembled position on the cross while holding the needle bearing assemblies in a fixture. The corresponding yoke surfaces 38 likewise are accurately machined and ground to predetermined dimensions. The machined surfaces 42 and 54 on the yokes and cups respectively are brought into full surface contact in the joint.

Universal joint constructions are known in which keeper or retainer plates are used between the yokes and the trunnion cross member to center the spider of cross with respect to the yokes and reduce end play in the bearing cups. However, these arrangements are only usable for straight needle bearing construction and they do not control and maintain a predetermined amount of preload in the bearings. Tapered needle bearings on the other hand have to be provided with proper loading to assure smooth operation.

The invention therefore provides for the first time a universal joint assembly wherein the method of manufacture assures proper loading of tapered roller trunnion bearings throughout substantially the useful life of the joint as measured by bearing wear.

The invention may be embodied in other specific forms without departing from the spirit or essential characteristics therefore. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of manufacturing a universal joint assembly which comprises providing a yoke and accurately machining on said yoke concave cylindrical surfaces lying in the same cylindrical envelope, providing a cross member having diametrically opposed trunnions formed at their ends with tapered bearing surfaces, placing on said trunnion bearing surfaces tapered roller bearings enclosed by correspondingly internally tapered bearing retainer members to provide a subassembly, placing said subassembly of cross member, roller bearings and retainer members in a holding fixture and applying sufficient force axially of said retainer members to preload said bearings in said subassembly, accurately machining external convex cylindrical surfaces lying in the same cylindrical envelope on said retainer members while said subassembly is held by said fixture in said preload condition to such dimension that intereference fit of said convex retainer member surfaces with the corresponding concave machined surfaces on said yoke will establish and maintain said bearing preload in the finished universal joint assembly, removing said fixture, assembling and rigidly securing said accurately machined yoke to said subassembly of cross member, bearings and retainer members with said machined cylindrical surfaces in interference fit whereby said bearings are accurately preloaded in the universal joint assembly.

2. In the method defined in claim 1, said steps of accurately machining said cylindrical surfaces including the steps of finish grinding said surfaces.

3. In the method defined in claim 1, the steps of accurately machining on said yoke and said bearing retainer members planar radial faces disposed at right angles to said cylindrical surfaces and adapted to axially abut in the final universal joint assembly.

References Cited by the Examiner

UNITED STATES PATENTS

| | | | |
|---|---|---|---|
| 1,717,817 | 6/29 | Sykes | 29—434 |
| 1,984,718 | 12/34 | Wistrand | 29—148.4 |
| 1,985,531 | 12/34 | Swenson | 29—404 |
| 1,987,415 | 1/35 | Padgett | 29—434 |
| 1,989,832 | 2/35 | Swenson. | |
| 1,999,487 | 4/35 | Swenson. | |
| 2,018,768 | 10/35 | Swenson. | |
| 2,024,206 | 12/35 | Buel | 64—18 |
| 2,034,507 | 3/36 | Colson | 51—278 |

FOREIGN PATENTS 832,784   4/60   Great Britain.

WHITMORE A. WILTZ, *Primary Examiner.*

ROBERT C. RIORDON, THOMAS H. EAGER,
*Examiners.*